United States Patent
Lee et al.

(10) Patent No.: US 10,841,228 B2
(45) Date of Patent: Nov. 17, 2020

(54) ABNORMAL FLOW DETECTION DEVICE AND ABNORMAL FLOW DETECTION METHOD THEREOF

(71) Applicant: Institute For Information Industry, Taipei (TW)

(72) Inventors: Kun-Wei Lee, Taipei (TW); Chin-Wei Chen, Nantou County (TW); Te-En Wei, Taipei (TW); Hsiao-Hsien Chang, Taipei (TW)

(73) Assignee: Institute For Information Industry, Taipei (TW)

( * ) Notice: Subject to any disclaimer, the term of this patent is extended or adjusted under 35 U.S.C. 154(b) by 106 days.

(21) Appl. No.: 16/211,227

(22) Filed: Dec. 5, 2018

(65) Prior Publication Data

US 2020/0153742 A1    May 14, 2020

(30) Foreign Application Priority Data

Nov. 9, 2018   (TW) .............................. 107139868 A

(51) Int. Cl.
*H04L 12/851* (2013.01)
*H04L 12/891* (2013.01)
*H04L 12/26* (2006.01)

(52) U.S. Cl.
CPC .......... *H04L 47/2483* (2013.01); *H04L 43/16* (2013.01); *H04L 47/41* (2013.01)

(58) Field of Classification Search
CPC ...... H04L 47/2483; H04L 43/16; H04L 47/41
USPC ....................................................... 709/224
See application file for complete search history.

(56) References Cited

U.S. PATENT DOCUMENTS

| | | | |
|---|---|---|---|
| 2019/0034703 A1* | 1/2019 | Hong | ................. G06K 9/00899 |
| 2019/0215329 A1* | 7/2019 | Levy | ....................... G06F 21/56 |
| 2019/0228110 A1* | 7/2019 | Yan | ......................... G06F 30/00 |
| 2020/0019699 A1* | 1/2020 | Araujo | ..................... G06N 3/08 |
| 2020/0065479 A1* | 2/2020 | Xia | ......................... G06N 20/20 |
| 2020/0067935 A1* | 2/2020 | Carnes, III | .......... H04L 63/1416 |
| 2020/0090002 A1* | 3/2020 | Zhu | ........................ G06N 20/00 |

\* cited by examiner

*Primary Examiner* — Philip C Lee

(74) *Attorney, Agent, or Firm* — Skaar Ulbrich Macari, P.A.

(57) ABSTRACT

An abnormal flow detection device and an abnormal flow detection method thereof are provided. The abnormal flow detection device analyses a plurality of packets captured during a time interval to obtain a plurality of flow features of each packet and selects at least one key flow feature from the flow features based on a dimensionality reduction algorithm. The abnormal flow detection device trains a bidirectional generative adversarial network (BiGAN) by taking the at least one key flow feature of each packet as an input of the BiGAN to build a flow recognition model for detecting abnormal flows.

18 Claims, 12 Drawing Sheets

ABNORMAL FLOW DETECTION DEVICE AND ABNORMAL FLOW DETECTION METHOD THEREOF

PRIORITY

This application claims priority to Taiwan Patent Application No. 107139868 filed on Nov. 9, 2018, which is hereby incorporated by reference in its entirety.

FIELD

The present invention relates to an abnormal flow detection device and abnormal flow detection method thereof. Specifically, the abnormal flow detection device obtains at least one key flow feature of a plurality of packages based on a dimensionality reduction algorithm and trains a bidirectional generative adversarial network (BiGAN) to build a flow recognition model for detecting abnormal flows.

BACKGROUND

With the rapid development of science and technology, various applications of network communication are ubiquitous in people's life, and demands of people for network communication are increasing day by day. Therefore, the security of network communication also becomes more and more important. One of the research issues about network safety recently is that hackers can attack and manipulate specific victim's computer (e.g., the server of an enterprise) by giving orders to the computers infected by zombie viruses via a command-and-control server (hereinafter called the C2 server). The attack may be a SPAM attack, a click fraud (CF) attack, a port scan (PS) attack, a fast flux (FF) attack, or etc.

In addition, the C2 server usually adopts the Internet relay chat (IRC) protocol, the HyperText transfer Protocol (HTTP) or the point-to-point (P2P) network structure to give orders to the computers infected by the zombie viruses. The existed defense and detection systems usually adopt the signature-based or machine learning technologies to detect abnormal flows. However, the samples of the abnormal flows are not easy to collect in reality, so the number of the samples is limited and the diversity of the samples is insufficient. Consequently, the existed defense and detection systems could not detect abnormal flows effectively.

Accordingly, an urgent need exists in the art to provide an abnormal flow detection mechanism which can effectively detect abnormal flows.

SUMMARY

Provided is an abnormal flow detection mechanism, which can effectively detect abnormal flows. Specifically, the abnormal flow detection mechanism can obtain multiple features through analyzing the packets, select the key feature(s) from the features through analyzing the features by the dimensionality reduction algorithm, and increase the diversity of the samples through a deep learning algorithm to strengthen the ability for detecting abnormal flows. Therefore, the abnormal flow detection mechanism can solve the problem of the limited number and insufficient diversity of the abnormal flow samples so that the abnormal flow detection mechanism can detect abnormal flows effectively.

The disclosure includes an abnormal flow detection device, which includes a storage, a network interface and a processor. The processor is electrically connected to the storage and the network interface and is configured to execute the following operations: capturing a plurality of first outgoing packets transmitted from an internal network to an external network during a first time interval via the network interface; analyzing the first outgoing packets to generate a plurality of outgoing flow data, wherein each of the outgoing flow data has a plurality of outgoing features; calculating the outgoing flow data based on a dimensionality reduction algorithm to select at least one key outgoing feature from the outgoing features and generate a plurality of outgoing training data corresponding to the outgoing flow data; inputting the outgoing training data into a bidirectional generative adversarial network (BiGAN) as a plurality of first input samples of the BiGAN to train the BiGAN according to the first input samples to build an outgoing flow recognition model; capturing a plurality of second outgoing packets transmitted from the internal network to the external network during a second time interval via the network interface; analyzing the second outgoing packets to generate a plurality of under-recognized outgoing flow data, wherein each of the under-recognized outgoing flow data has the at least one key outgoing feature; and inputting each of the under-recognized outgoing flow data to the outgoing flow recognition model to determine whether the second outgoing packets produce an abnormal outgoing flow.

The disclosure also includes an abnormal flow detection method for an abnormal flow detection device. The abnormal flow detection device includes a storage, a network interface and a processor. The processor is electrically connected to the storage and the network interface. The abnormal flow detection method is executed by the processor and includes the following steps: capturing a plurality of first outgoing packets transmitted from an internal network to an external network during a first time interval via the network interface; analyzing the first outgoing packets to generate a plurality of outgoing flow data, wherein each of the outgoing flow data has a plurality of outgoing features; calculating the outgoing flow data based on a dimensionality reduction algorithm to select at least one key outgoing feature from the outgoing features and generate a plurality of outgoing training data corresponding to the outgoing flow data; inputting the outgoing training data into a bidirectional generative adversarial network (BiGAN) as a plurality of first input samples of the BiGAN to train the BiGAN according to the first input samples to build an outgoing flow recognition model; capturing a plurality of second outgoing packets transmitted from the internal network to the external network during a second time interval via the network interface; analyzing the second outgoing packets to generate a plurality of under-recognized outgoing flow data, wherein each of the under-recognized outgoing flow data has the at least one key outgoing feature; and inputting each of the under-recognized outgoing flow data to the outgoing flow recognition model to determine whether the second outgoing packets produce an abnormal outgoing flow.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. These example embodiments are not intended to limit the present invention to any specific example, embodiment, environment, applications or particular implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 1:
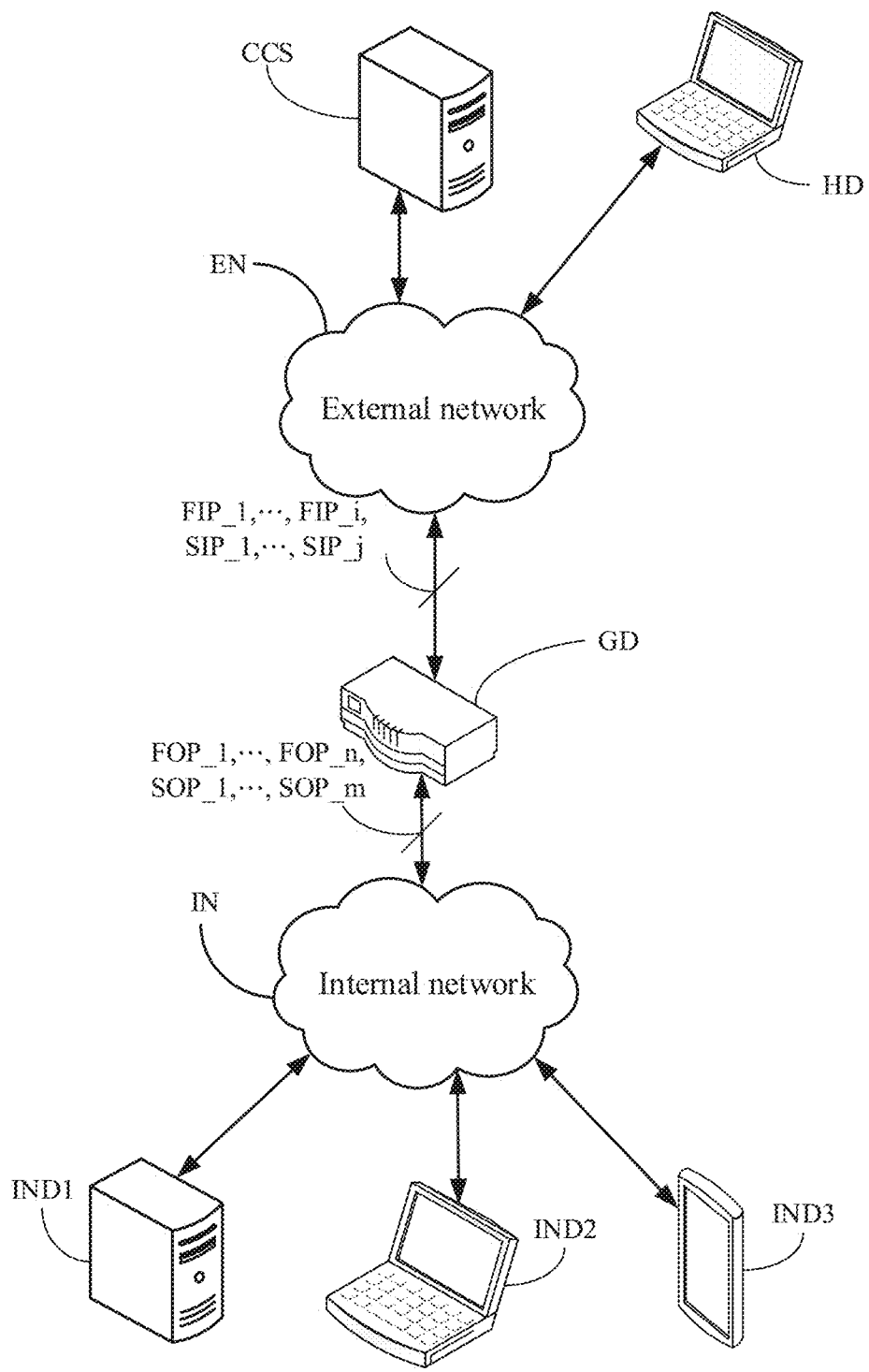
FIG. 1 depicts a schematic view of an implementation scenario according to the present invention.
Figure 2:
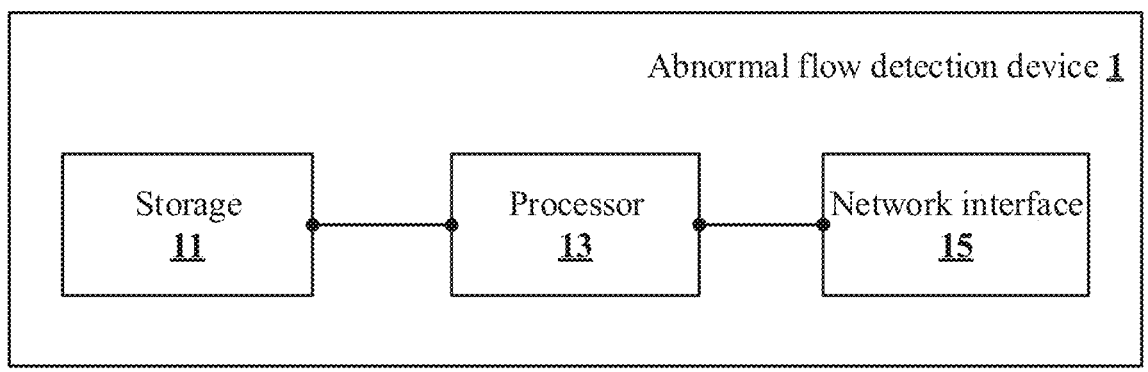
FIG. 2 is a schematic view of the abnormal flow detection device 1 according to the present invention.

A first embodiment of the present invention is as shown in FIG. 1 to FIG. 2. FIG. 1 depicts an implementation scenario according to the present invention, and FIG. 2 is a schematic view of the abnormal flow detection device 1 according to the present invention. The abnormal flow detection device 1 includes a storage 11, a processor 13 and a network interface 15. The storage 11 and the network interface 15 are electrically connected to the processor 13.

The abnormal flow detection device 1 of the present invention may be implemented as a gateway device GD which is configured to connect to an internal network IN and an external network EN. The internal network IN is connected to a plurality of internal devices (e.g., internal devices IND1, IND2 and IND3). The internal network IN may be an internal network of an enterprise, an internal network of a school or an internal network of any team. The internal network IN usually includes a plurality of routers (e.g., a wired router, a wireless router or a combination thereof), so each of the internal devices IND1, IND2 and IND3 may be connected to the gateway device GD via one or more routers or directly connected to the gateway device GD via network lines or wireless communication. Each of the internal devices IND1, IND2 and IND3 may be a personal computer, a server, a laptop, a tablet computer or any device that can be infected by zombie viruses. To simplify the description, only three internal devices IND1, IND2 and IND3 are depicted in FIG. 1. However, the number of internal devices is not intended to limit the scope of the present invention.

Moreover, a hacker device HD may distribute the zombie viruses to the internal devices IND1, IND2 and IND3 via the external network EN and the gateway device GD by controlling a command-and-control server (hereinafter called the C2 server) CCS. The external network EN may include an Internet, a telecommunication network and any wired or wireless communication network. In order to detect whether the internal devices IND1, IND2 and IND3 are infected by the zombie viruses, the gateway device GD can capture and analyze the outgoing packets transmitted from the internal network IN to the external network EN to detect whether an abnormal flow exists.

On the other hand, the abnormal flow detection device 1 of the present invention may also be implemented as an internal device (e.g., the internal device IND1) which is connected to the internal network IN and is connected to the external network EN via the gateway device GD. The internal device IND1 may capture the packets transmitted from the internal network IN to the external network EN and the packets transmitted from the external network EN to the internal network IN through the gateway device GD, and analyze the packets to screen the suspicious packets. In other words, the gateway device GD can forward all of the packets, which go through to the gateway device GD, to the internal device IND1. How the abnormal flow detection device 1 of the present invention is implemented as the gateway device GD and the internal device IND1 shall be readily appreciated by those of ordinary skill in the art based on the above description, so the subsequent description only describes how the abnormal flow detection device 1 analyzes the packets, builds the model for detecting abnormal flows and detects the suspicious flows through the model.

Please continue to refer to FIG. 2. First, in order to build a model for detecting abnormal flows, the present invention makes multiple internal devices execute at least one zombie virus within a first time interval (e.g., within 24 hours), respectively. Each of the internal devices may be a virtual device (e.g., a virtual host or a virtual computer) created by the abnormal flow detection device 1 or may be a physical device (e.g., the internal devices IND1, IND2 and IND3). The zombie viruses may include the zombie viruses for the SPAM attack, the CF attack, the PS attack, the DDoS attack or the FF attack, and the zombie viruses which communicate through the IRC protocol, the HTTP or the P2P network structure. The number and type of the zombie viruses executed by each of the internal devices are chosen randomly or decided based on different implementation scenarios.

Meanwhile, the processor 13 captures a plurality of first outgoing packets FOP_1-FOP_n transmitted from the internal network IN to the external network EN during a first time interval via the network interface 15, wherein n is a positive integer. The first outgoing packets FOP_1-FOP_n include the packets generated by each of the internal devices which execute at least one zombie virus. Afterwards, the processor 13 analyzes each of the first outgoing packets FOP_1-FOP_n to obtain relevance information PI of each of the first outgoing packets FOP_1-FOP_n.

Figure 3:
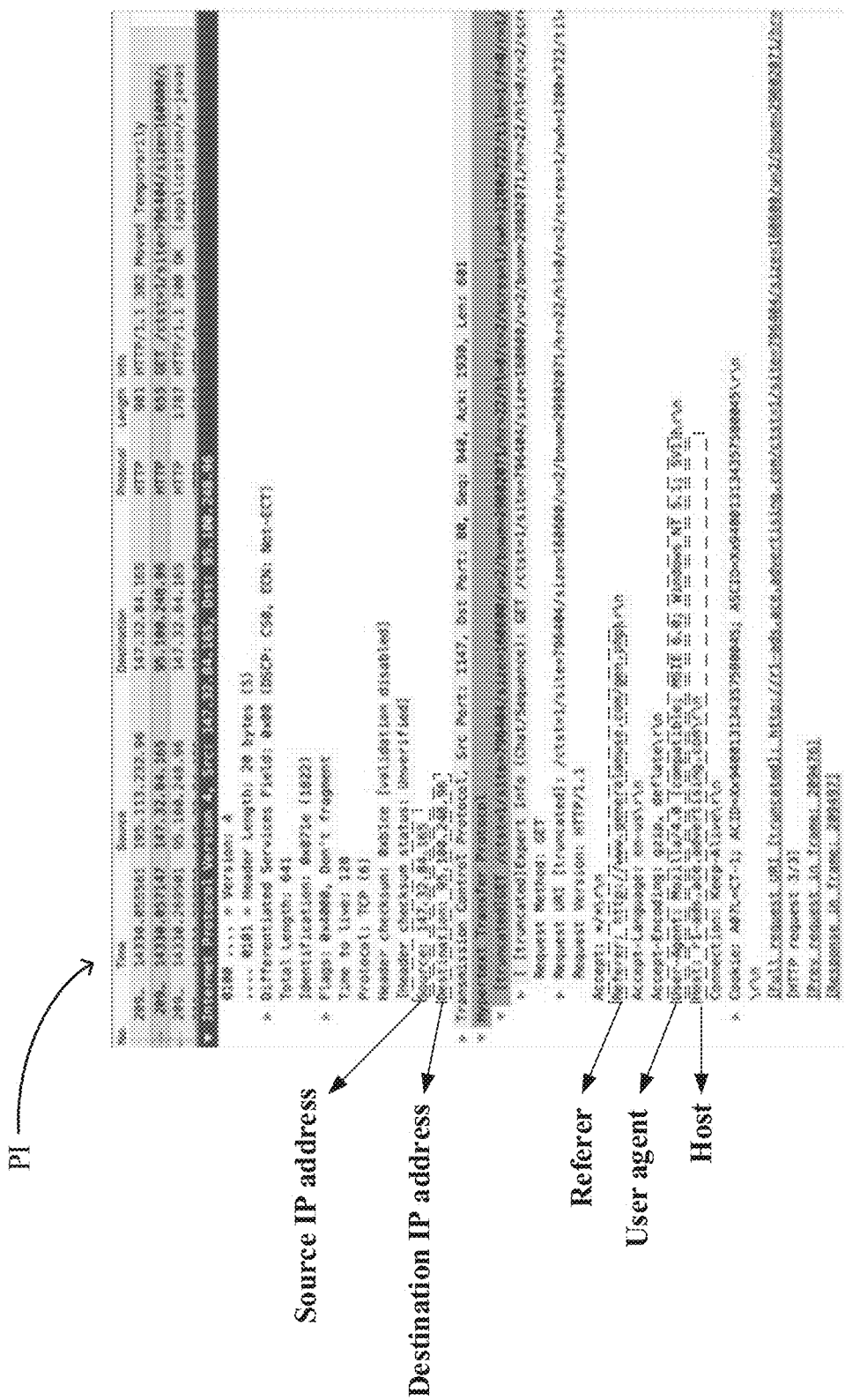
FIG. 3 is an implementation scenario of relevance information PI according to the present invention.

For example, the relevance information PI may be shown in FIG. 3, which includes the Internet Protocol (IP) layer information (e.g., the source IP address, the destination IP address) and the HTTP layer information (e.g., the referrer, the user agent, the host). Afterwards, the processor 13 generates a plurality of outgoing flow data based on the relevance information of the first outgoing packets FOP_1-

FOP_n. Each of the outgoing flow data has a plurality of outgoing features. The outgoing features may include an IP feature, an HTTP feature and a flow fraction feature.

The IP feature may further include at least one of the following features as shown in table 1.

TABLE 1

| Name of feature | Content of feature |
|---|---|
| NewDest | the number of the destination IPs which do not appear within a past time period (e.g., within the past week, counting by hours) |
| NewDestRef | the number of the destination IPs which are not recorded in a whitelist and do not appear within the past time period (the whitelist is pre-generated and is stored in the storage 11) |
| UnpopularIP | the number of the destination IPs which is not recorded in the whitelist |
| FracUnIP | the fraction of the destination IPs which are not recorded in the whitelist, i.e., the number of uncommon connections/the number of total connections |

The HTTP feature may further include at least one of the following features as shown in table 2.

TABLE 2

| Name of feature | Content of feature |
|---|---|
| New User-Agent | the number of packets(connections) whose user agents are new or not similar to the user agents in the past time period |
| Blocked domains | the number of the domains which the internal device connects to and which are recorded in a blacklist (the blacklist is pre-generated, and is stored in the storage 11) |
| Challenged domains | the number of the domains which the internal device connect to and are not recorded in both the blacklist and the whitelist |
| Consented domains | the number of domains which the internal devices which connect and are recorded in the whitelist |
| Blocked connections | the number of packets transmitted by the internal device to the domains recorded in the blacklist |
| Challenged connections | the number of packets transmitted by the internal device to the domains that are not recorded in both the blacklist and the whitelist |
| Consented connections | the number of packets transmitted by the internal device to the domains recorded in the whitelist |

The flow fraction feature may further include at least one of the following features as shown in table 3.

TABLE 3

| Name of feature | Content of feature |
|---|---|
| ConnSpikes | the number of times the connection spike occurs, the connection spike means that the outgoing packets of the internal device take up over 90% of overall outgoing flow within an unit time (e.g., per minute, per ten minutes) |
| DomSpikes | the number of times the domain spike occurs, the domain spike means that for the connections to a domain, the outgoing packets of the internal device take up over 90% of overall outgoing flow within an unit time (e.g., per minute, per ten minutes) |
| ConnBursts | how many unit times at most the connection spike occurs continuously in the internal device (e.g., if the unit time is defined as 1 minute and there are continuous three unit times (continuous 3 minutes) in which the connection spike occurs, then the outgoing feature ConnBursts is 3) |
| DomBursts | how many unit times at most the domain spike occurs continuously in the internal device |

For the first outgoing packets FOP_1-FOP_n captured in 24 hours (i.e., the first time interval), the processor 13 divides the first outgoing packets FOP_1-FOP_n into a plurality of internal groups according to the source information (e.g., the IP address or the MAC address) of each of the first outgoing packets FOP_1-FOP_n; that is to say, the processor 13 distinguishes the packets by different internal devices. Next, for the packets generated by each internal device, the processor 13 divides them into a plurality of sets according to different time intervals (e.g., every hour). In other words, for the packets generated by each internal device within 24 hours, the processor 13 divides the packets into multiple sets according to each hour interval, so the packets generated by each internal device within 24 hours are divided into 24 sets.

Figure 4:
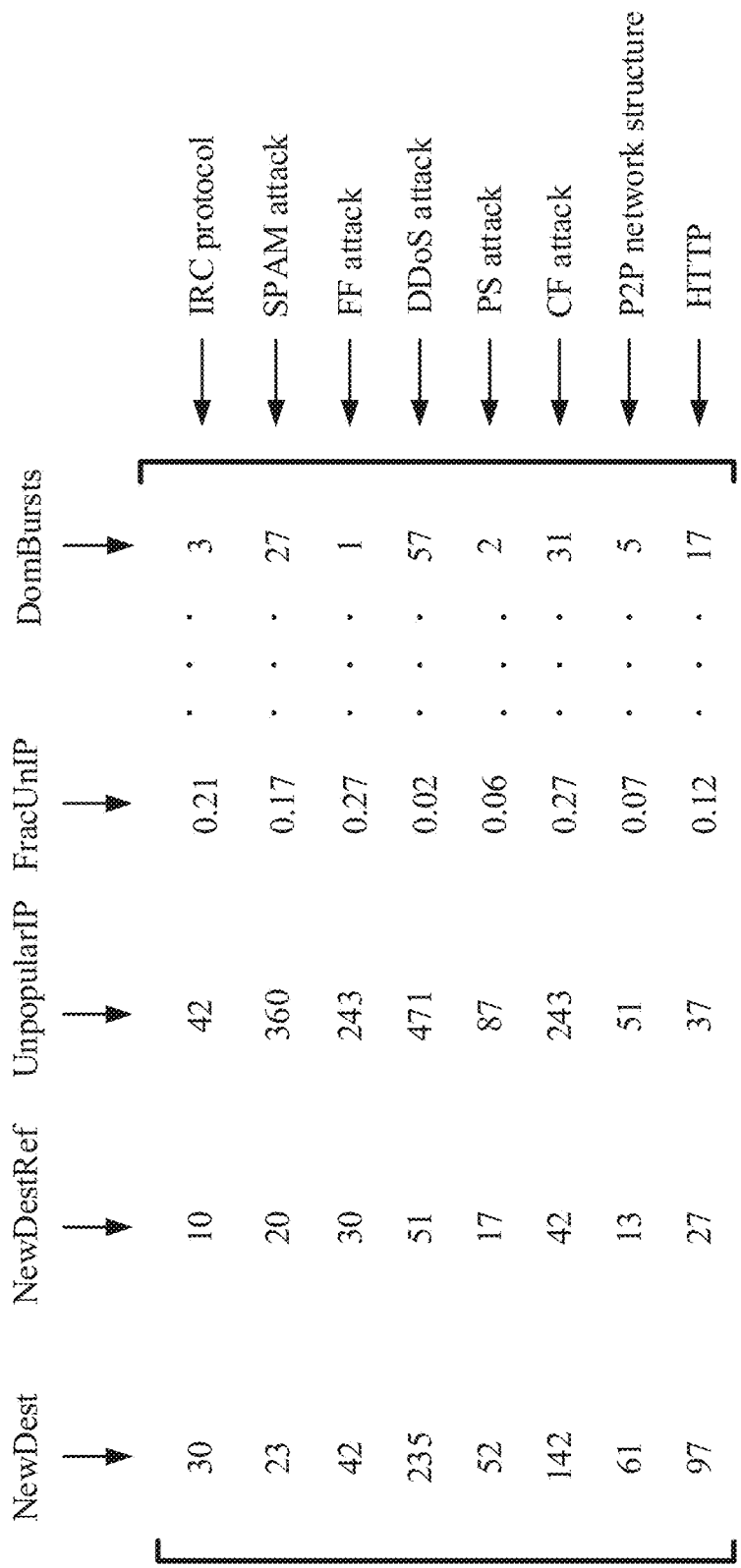
FIG. 4 is a schematic view of the matrix representing the outgoing flow data according to the present invention.

For the packets in each set, the processor 13 further analyzes the packets for different abnormal scenarios (e.g., the SPAM attack, the CF attack, the DDoS attack, the FF attack, the IRC protocol, the HTTP and the P2P network structure) to generate the outgoing flow data. As shown in FIG. 4, the 8 pieces of outgoing flow data generated by the processor 13 after analyzing the packets generated by an internal device within an hour may be represented as a matrix. The values of each row in the matric represents a piece of outgoing flow data and the 8 pieces of outgoing flow data are respectively related to one of the abnormal scenarios as described above (i.e., related to one of the zombie viruses). Each column in the matrix records the feature values of the outgoing features as described above.

After generating the outgoing flow data corresponding to each of the internal devices through the aforementioned way, the processor 13 calculates the outgoing flow data based on a dimensionality reduction algorithm to select at least one key outgoing feature from the outgoing features. The dimensionality reduction algorithm may be one of a linear discriminant analysis (LDA) algorithm, a principal components analysis (PCA) algorithm and a singular value decomposition (SVD) algorithm, but not limited thereto.

Figure 5:
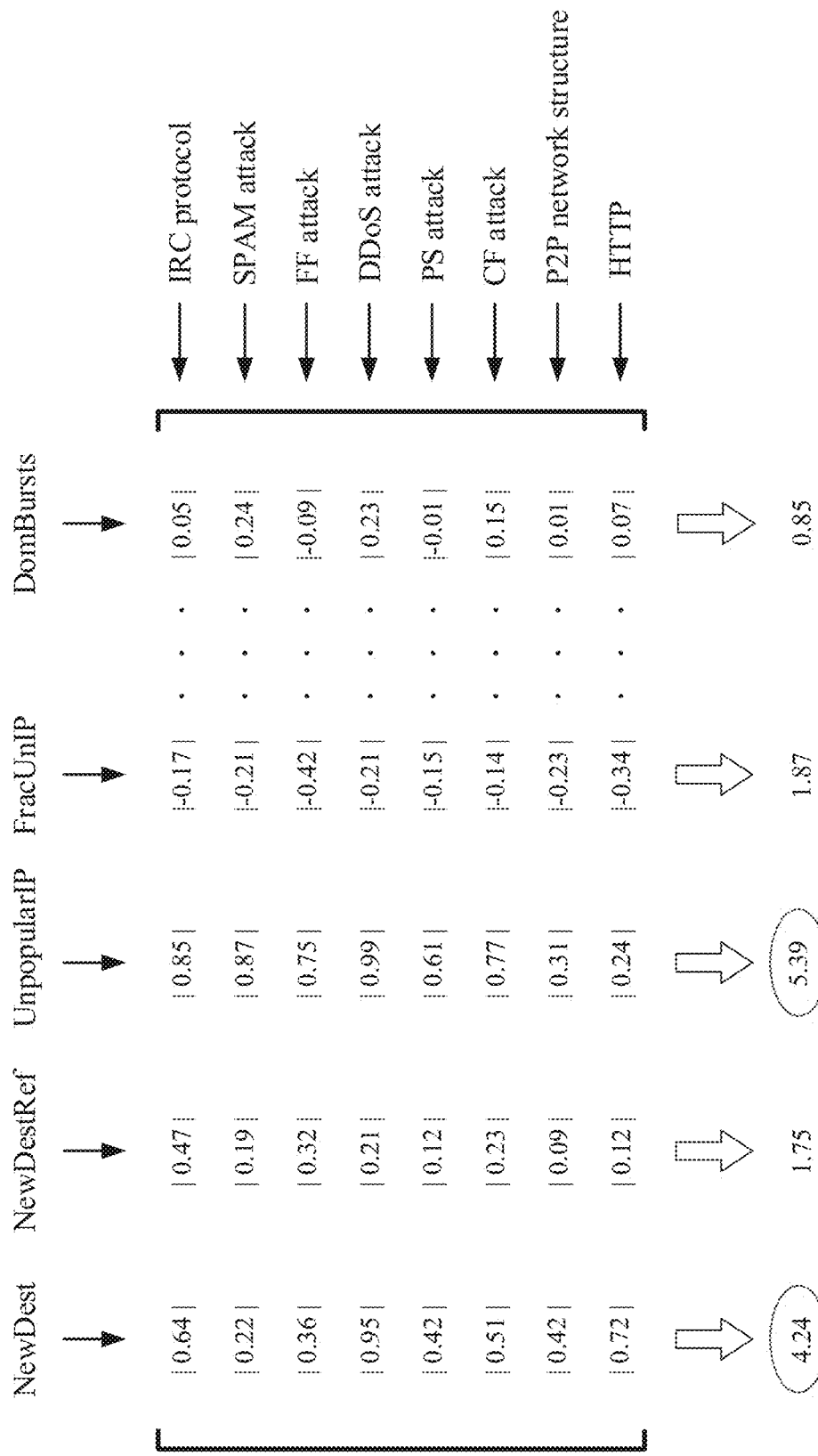
FIG. 5 illustrates how the processor 13 obtains each weight value corresponding to each outgoing feature by calculating the outgoing flow data based on the LDA algorithm.

FIG. 5 illustrates how the processor 13 obtains each weight value corresponding to each outgoing feature by calculating the outgoing flow data based on the LDA algorithm. It shall be noted that, the weight value of each of the outgoing flow data has been normalized so that each weight value is in the range of −1 to 1. The normalization may be done through the following formula:

$$w' = 2\frac{w - \min w}{\max w - \min w} - 1$$

wherein w is the original weight value, min w is the minimum weight value among the weight values, max w is the maximum weight value among the weight values, and w' is the normalized weight value.

After normalizing the weights, the processor 13 gets the absolute values of the normalized weight values and sums up the absolute values of the normalized weight values corresponding to each outgoing feature of the abnormal scenarios, respectively (i.e., sums up each column) Afterwards, the processor 13 compares the summed weight value corresponding to each outgoing feature with a key threshold (e.g., 4) to select the outgoing feature. Any outgoing feature, the summed weight value of which is greater than the key threshold, would be selected as the key outgoing feature. In this example, the outgoing feature "NewDest" and the outgoing feature "UnpopularIP" are selected as the key features.

After selecting the key outgoing features, the processor 13 retrieves at least one key outgoing feature from the outgoing flow data and generates a plurality of outgoing training data. In detail, the outgoing training data corresponds to the outgoing flow data one-to-one, and the outgoing training data only includes key outgoing feature(s) as compared to the outgoing flow data. Then, the processor 13 inputs the outgoing training data into a bidirectional generative adversarial network (BiGAN) as a plurality of first input samples of the BiGAN to train the BiGAN according to the first input samples to build an outgoing flow recognition model.

Figure 6:
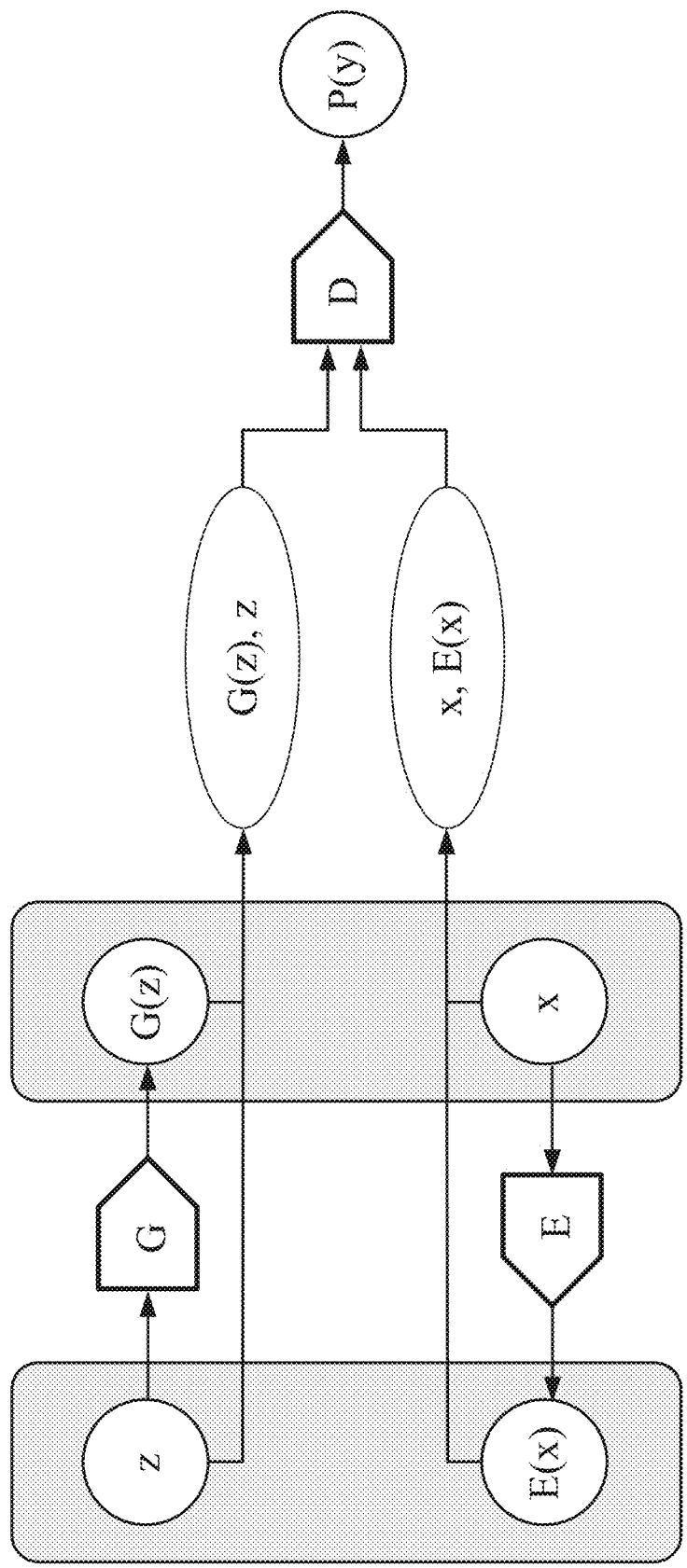
FIG. 6 is a schematic view of the bidirectional generative adversarial network according to the present invention.

FIG. 6 is a schematic view of the BiGAN, wherein x represents the input sample, E represents the encoder, E(x) represents the output of the encoder and is the feature of the input sample, z represents the fake feature, G represents the generator, G(z) represents the output of the generator and is the fake data, D represents the discriminator. y represents the sign indicating that the discriminator input is determined to be real or fake by the discriminator D. y=1 means that discriminator input is determined to be fake, and y=0 means that the discriminator input is determined to be real. P(y) represents the probability, and P(y=1) represents the probability that the discriminator D determines the discriminator input is fake. During the training process of the BiGAN, the fake feature z will become more and more similar to the output E(x) of the generator E, and the discriminator D will be harder and harder to decide the real/fake between the input sample x and the output G(z) of the generator G. Finally, the processor 13 builds the outgoing flow recognition model based on the encoder E, the generator G and the discriminator D of the trained BiGAN and stores the outgoing flow recognition model into the storage 11.

The outgoing flow recognition model is used for identifying the packets which are not transmitted within the first time interval, i.e., the outgoing flow recognition model is used for detecting actual flows which are different from the flows within the first time interval. From the above explanation, the flows within the first time interval are only used to generate the outgoing flow samples of the botnet for the abnormal flow detection device 1 to extract the important features from the outgoing flow samples to train the BiGAN so as to solve the problem of the limited number and insufficient diversity of the abnormal flow samples.

In detail, the processor 13 captures a plurality of second outgoing packets SOP_1-SOP_m transmitted from the internal network IN to the external network EN during a second time interval (e.g., one hour) via the network interface 15, wherein m is a positive integer. The second outgoing packets SOP_1-SOP_m includes the packets generated by one or multiple internal device (e.g., internal device IND1, IND2 and IND3) when operating normally (i.e., unintentionally executes zombie viruses). Afterwards, the processor 13 analyzes the second outgoing packets SOP_1-SOP_m to generate a plurality of under-recognized outgoing flow data UOD_1-UOD_p, wherein p is a positive integer and is related to the number of the internal devices. It is assumed that there are three kinds of source information of the second outgoing packets SOP_1-SOP_m, so the packets in the one hour are generated by three internal devices, and there are 3 pieces of the under-recognized outgoing flow data. Each of the under-recognized outgoing flow data UOD_1-UOD_p has at least one key outgoing feature (e.g., the aforesaid outgoing features NewDest and UnpopularIP). Then, the processor 13 inputs each of the under-recognized outgoing flow data UOD_1-UOD_p to the outgoing flow recognition model to determine whether the second outgoing packets SOP_1-SOP_m produce an abnormal outgoing flow.

Figure 7:
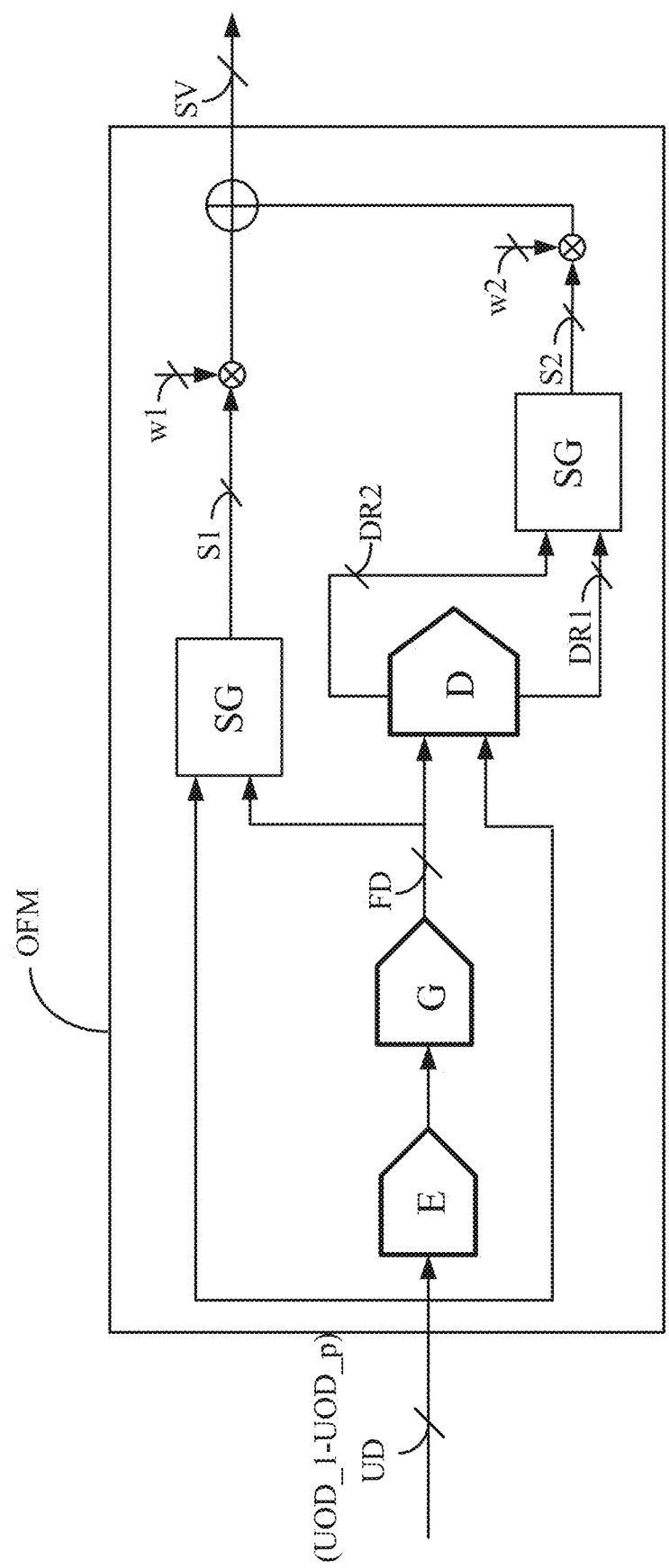
FIG. 7 is a schematic view of the outgoing flow recognition model OFM according to the present invention.

For example, the outgoing flow recognition model OFM is shown in FIG. 7. The outgoing flow recognition model OFM includes the encoder E, the generator G and the discriminator D. The processor 13 takes each of the under-recognized outgoing flow data UOD_1-UOD_p as the input data UID of the outgoing flow recognition model OFM. The processor 13 calculates a first difference value S1 between a fake data FD generated by the generator G and the input data UID (i.e., the under-recognized outgoing flow data). In addition, the processor 13 further calculates a second difference value S2 between two discrimination values DR1, DR2 generated by the discriminator D according to the input data UID (i.e., the under-recognized outgoing flow data) and the fake data FD. It shall be noted that, the discrimination values DR1, DR2 generated by the discriminator D refer to the computed result of the second last layer of the BiGAN. Since those of ordinary skill in the art are familiar with the neutral network structure and the computed result of the second last layer of the BiGAN, it will not be further described here.

The computing unit SG for the first difference value S1 and the second difference value S2 can be achieved by a loss function, e.g., the cross entropy function or the feature matching loss function. After obtaining the first difference value S1 and the second difference value S2, the processor 13 calculates a sum SV of the first difference value S1 multiplied by a first weight value w1 and the second difference value S2 multiplied by a second weight value w2. It shall be appreciated that, the first weight value w1 and the second weight value w2 can be adjusted according to the actual operating situation, e.g., the user may evaluate the importance of the generator G and the discriminator D, and adjust the first weight value w1 and the second weight value w2 accordingly. The sum of the first weight value w1 and the second weight value w2 would be 1 (e.g., w1=0.7 and w2=0.3). Next, the processor 13 determines whether the sum SV is greater than a sum threshold. When the sum SV is greater than the sum threshold, the processor 13 determines that the second outgoing packets (i.e., a part of the second outgoing packets SOP_1-SOP_m) corresponding to the input data UID (i.e., the under-recognized outgoing flow data) produce the abnormal outgoing flow. As a result, the abnormal flow detection device 1 can learn which internal device produces the abnormal flow according to the sum SV generated by the outgoing flow recognition model OFM in response to inputting the under-recognized outgoing flow data UOD_1-UOD_p.

It shall be noted that, the aforesaid sum threshold is determined based on the adopted loss function, and those of ordinary skill in the art can understand that the present invention trains the generator G of the BiGAN to generate the flows with the features similar to those generated by the zombie viruses. Therefore, the greater the first difference value S1 and the second difference value S2 are, the greater the difference between the fake data FD and the input data UID is, so the input data UID are considered as generated from a normal flow. On the contrary, the smaller the first difference value S1 and the second difference value S2 are, the smaller the difference between the fake data FD and the input data UID is, so the input data UID are considered as generated from an abnormal flow.

Please still refer to FIGS. 1-2 for the second embodiment of the present invention. The second embodiment is an extension of the first embodiment. In this embodiment, the abnormal flow detection device 1 further generates an incoming flow recognition model to detect abnormal incoming flows. In this embodiment, the present invention makes the multiple internal devices execute at least one zombie virus respectively during a third time interval (e.g., 7 days). Each of the internal devices may be a virtual device (e.g., a virtual host or a virtual computer) created by the abnormal flow detection device 1 or may be a physical device (e.g., the internal devices IND1, IND2 and IND3). Similarly, the zombie viruses may include the zombie viruses for the SPAM attack, the CF attack, the PS attack, the DDoS attack or the FF attack, and the zombie viruses which communicate through the IRC protocol, the HTTP or the P2P network structure. The number and the type of the zombie virus executed by each of the internal devices are chosen randomly or decided based on different implementation scenarios.

Likewise, the processor 13 captures a plurality of first incoming packets FIP_1-FIP_i transmitted from the external network EN to the internal network IN during the third time interval (e.g., the aforesaid 7 days) via the network interface 15, wherein i is a positive integer. The first incoming packets FIP_1-FIP_i include the packets which are transmitted to each of the aforesaid internal devices that executes at least one zombie virus. Afterwards, the processor 13 analyzes each of the first incoming packets FIP_1-FIP_i to obtain relevance information PI of each of the first incoming packets FIP_1-FIP_i. Similarly, the relevance information PI may be shown in FIG. 3. The relevance information PI includes the IP layer information (e.g., the source IP address, the destination IP address) and the HTTP layer information (e.g., the referrer, the user agent, the host).

Afterwards, the processor 13 generates a plurality of incoming flow data based on the relevance information of the first incoming packets FIP_1-FIP_i. Each of the incoming flow data has a plurality of incoming features. The incoming features may include a host connection feature, a URL connection feature and a domain registration information feature.

The host connection feature may further include at least one of the following features as shown in table 4.

TABLE 4

| Name of information | Content of information |
| --- | --- |
| Nohost | the number of internal devices connecting to the domain |
| AutoHost | the number of internal devices automatically and routinely connecting to the domain |

The URL connection feature may further include at least one of the following features as shown in table 5.

TABLE 5

| Name of information | Content of information |
| --- | --- |
| NoRef | the fraction of the internal devices, whose HTTP layer information does not have the information of the referrer, among the internal devices connecting to the domain |
| RareUA | the fraction of the internal devices, whose HTTP layer information does not have the information of the user agent, or have the information of the user agent but such information is rare (e.g., seen less than 10 times), among the internal devices connecting to the domain |

The domain registration information feature may further include at least one of the following features as shown in table 6.

TABLE 6

| Name of information | Content of information |
| --- | --- |
| DomAge | the number of days from the registration date of the domain to date according to the WHOIS information |
| DomVaildity | the remaining number of days until the expiration date of the domain according to the WHOIS information |

For the first incoming packets FIP_1-FIP_i captured during 7 days (i.e., during the third time interval), the processor 13 divides the first incoming packets FIP_1-FIP_i into a plurality of external groups according to the source information (e.g., the domain) of each of the first incoming packets FIP_1-FIP_i; that is to say, the processor 13 distinguishes the packets by different domains. Besides, in this embodiment, the different internal devices may receive the packets with the same domain when executing the same zombie virus, so such domains also correspond to different abnormal scenarios (e.g., the SPAM attack, the CF attack, the DDoS attack, the FF attack, the IRC protocol, the HTTP and the P2P network structure), respectively. In other words, the number of the external groups is the same as the number of the kinds of the abnormal scenarios.

Figure 8:
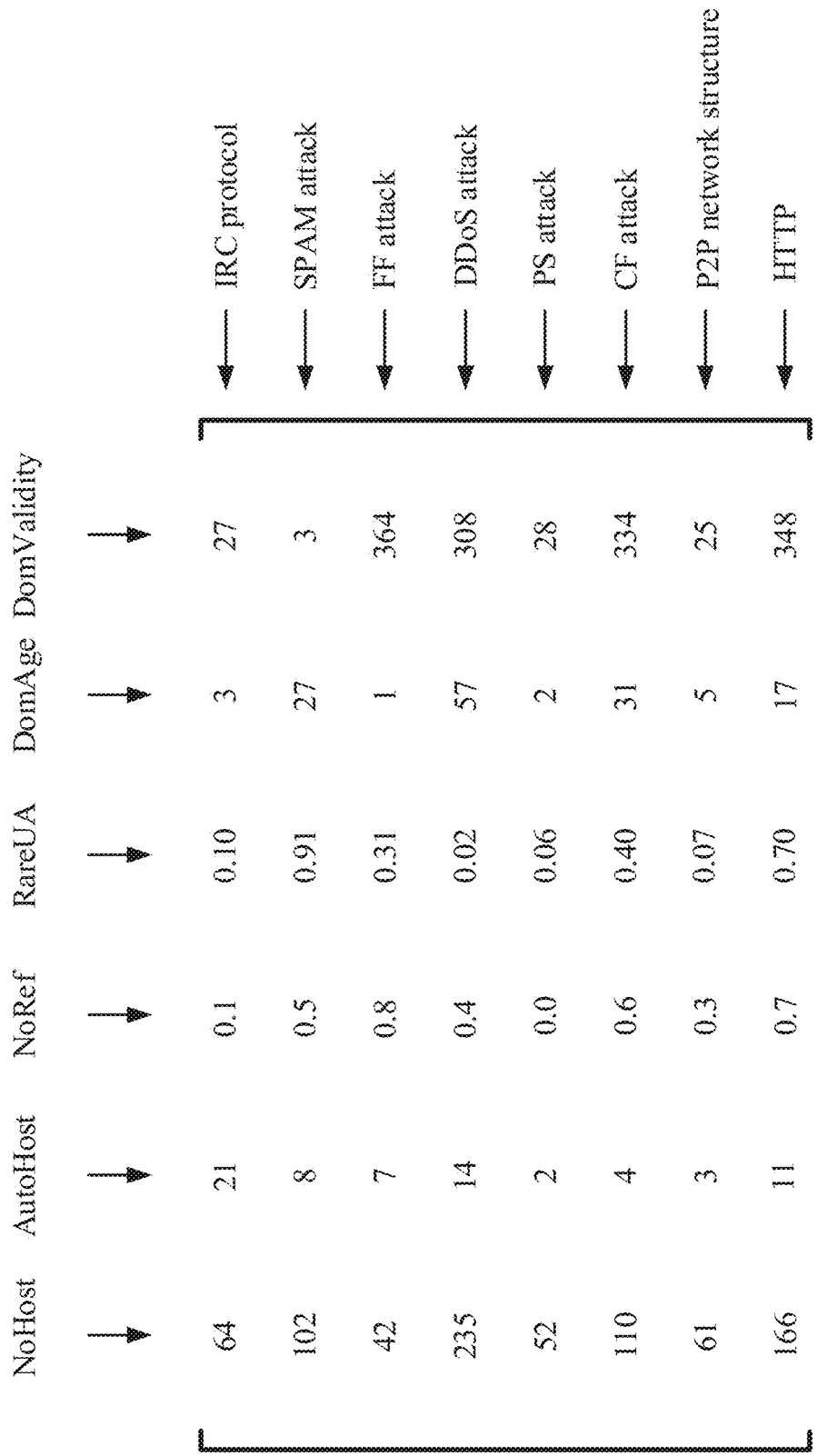
FIG. 8 is a schematic view of the matrix representing the incoming flow data according to the present invention.

Thereafter, for the packets corresponding to each domain, the processor 13 further divides them into different sets according to different time interval (e.g., everyday). In other words, for the packets corresponding to each domain within 7 days, the processor 13 divides the packets into multiple sets according to each day interval, so the packets corresponding to each domain within 7 days will be divided into 7 sets. Next, for the packets in each set, the processor 13 analyzes the packets to generate the outgoing flow data. As shown in FIG. 8, the 8 pieces of incoming flow data generated by the processor 13 after analyzing the packets corresponding to each domain within one day may be represented as a matrix. The values of each row in the matric represents a piece of incoming flow data and the 8 pieces of incoming flow data are respectively related to one of the abnormal scenarios as described above (i.e., related to one of the zombie viruses). Each column in the matrix records the feature values of the incoming features as described above.

Similarly, after generating the incoming flow data corresponding to each domain through the aforementioned way, the processor 13 calculates the incoming flow data based on the dimensionality reduction algorithm to select at least one key incoming feature from the incoming features. Likewise, the dimensionality reduction algorithm may be one of the LDA algorithm, the PCA algorithm and the SVD algorithm, but not limited thereto.

Figure 9:
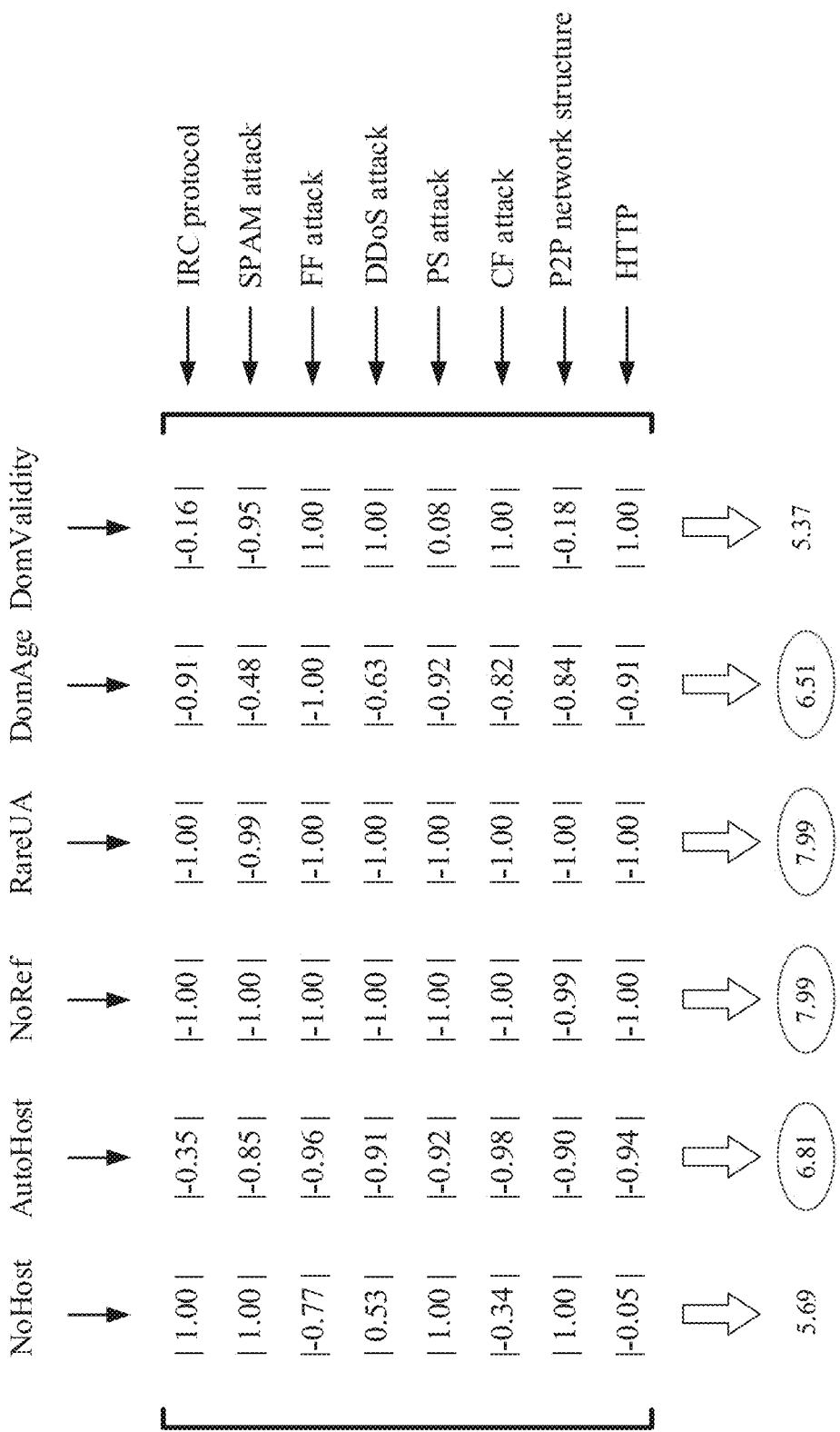
FIG. 9 illustrates how the processor 13 obtains each weight value corresponding to each incoming feature by calculating the incoming flow data based on the LDA algorithm.

FIG. 9 illustrates how the processor 13 obtains each weight value corresponding to each incoming feature by calculating the incoming flow data based on the LDA algorithm. It shall be noted that, the weight value of each of the incoming flow data has been normalized so that each weight value is in the range of −1 to 1. The normalization may be done through the formula as described in the first embodiment, thus will not further be further described here.

After normalizing the weight values, the processor 13 gets the absolute values of the normalized weight values and sums up the absolute values of the normalized weight values corresponding to each incoming feature of the abnormal scenarios, respectively. Afterwards, the processor 13 compares the summed weight value corresponding to each incoming feature with a key threshold (e.g., 6) to select the incoming feature. Any incoming feature, the summed weight value of which is greater than the key threshold, is selected as the key incoming feature. In this example, the incoming feature "AutoHost", the incoming feature "NoRef", the incoming feature "RareUA" and the incoming feature "DomAge" are selected as the key features.

After selecting the key incoming features, the processor 13 retrieves at least one key incoming feature from the incoming flow data and generates a plurality of incoming training data. In detail, the incoming training data corresponds to the incoming flow data one-to-one, and the incoming training data only includes key incoming feature(s) as compared to the incoming flow data. Then, the processor 13 inputs the incoming training data into a bidirectional generative adversarial network (BiGAN) as a plurality of second input samples of the BiGAN to train the BiGAN according to the second input samples to build an incoming flow recognition model. Since those of ordinary skill in the art may understand how to train the BiGAN based on the input training data to generate the incoming flow recognition model in this embodiment according to the description in the first embodiment, thus will not further be further described here.

After generating the incoming flow recognition model, the processor 13 captures a plurality of second incoming packets SIP_1-SIP_j transmitted from the external network EN to the internal network IN during a fourth time interval (e.g., one day) via the network interface 15, wherein j is a positive integer. Similarly, the second incoming packets SIP_1-SIP_j includes the packets received by one or multiple internal device (e.g., internal device IND1, IND2 and IND3) when operating normally (i.e., unintentionally executes zombie viruses).

Afterwards, the processor 13 analyzes the second incoming packets SIP_1-SIP_j to generate a plurality of under-recognized incoming flow data UID_1-UID_q, wherein q is a positive integer and is related to the number of the domains. It is assumed that there are five kinds of source information of the second incoming packets SIP_1-SIP_j, so the packets in the one day are received from five domains, and there are 5 pieces of the under-recognized incoming flow data. Each of the under-recognized incoming flow data UID_1-UID_q has at least one key incoming feature (e.g., the aforesaid incoming feature "AutoHost", the incoming feature "NoRef", the incoming feature "RareUA" and the incoming feature "DomAge"). Then, the processor 13 inputs each of the under-recognized incoming flow data UID_1-UID_q to the incoming flow recognition model to determine whether the second incoming packets SIP_1-SIP_m produce an abnormal incoming flow.

Figure 10:
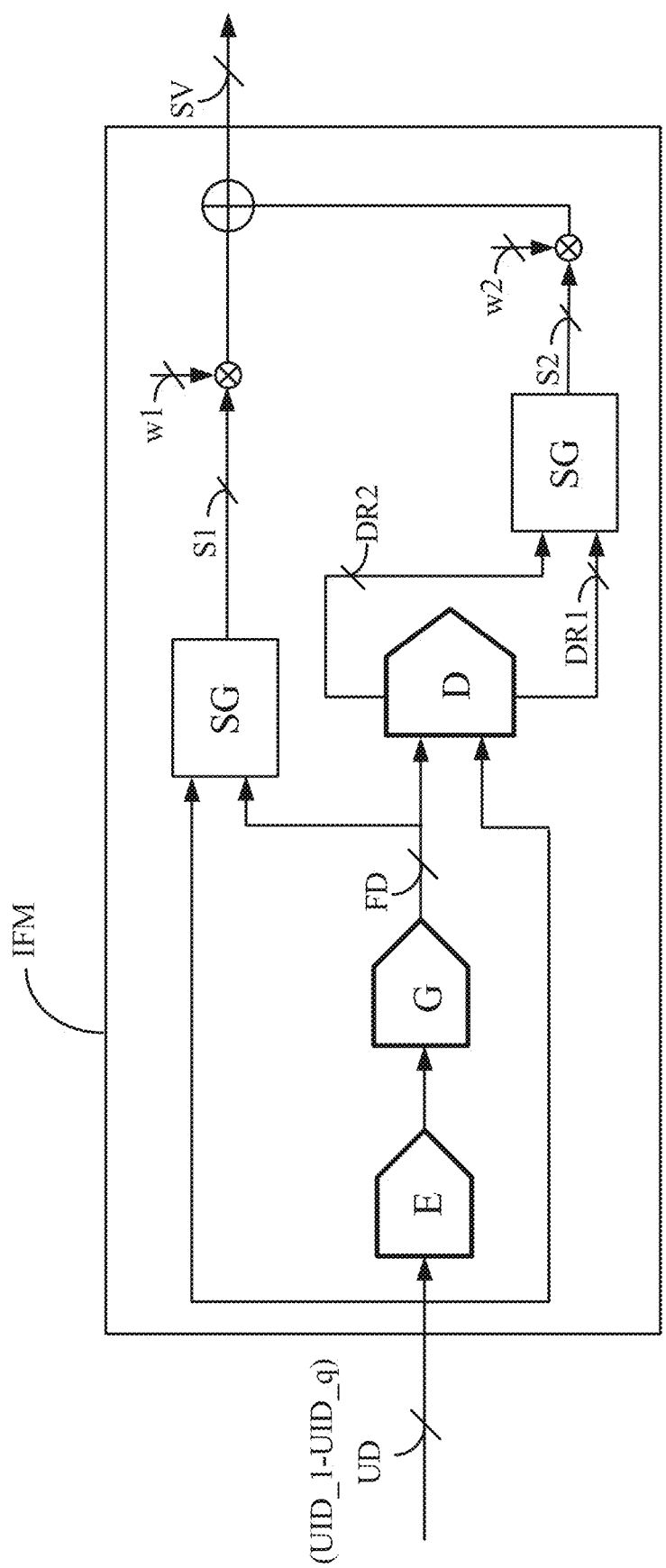
FIG. 10 is a schematic view of the incoming flow recognition model IFM according to the present invention.

For example, the incoming flow recognition model IFM is shown in FIG. 10. The incoming flow recognition model IFM includes the encoder E, the generator G and the discriminator D. The processor 13 takes each of the under-recognized incoming flow data UID_1-UID_q as the input data UID of the incoming flow recognition model IFM. The processor 13 calculates a first difference value S1 between a fake data FD generated by the generator G and the input data UID (i.e., the under-recognized incoming flow data). In addition, the processor 13 further calculates a second difference value S2 between two discrimination values DR1, DR2 generated by the discriminator D according to the input data UID (i.e., the under-recognized incoming flow data) and the fake data FD. It shall be noted that, the discrimination values DR1, DR2 generated by the discriminator D refer to the computed result of the second last layer of the BiGAN. Since those of ordinary skill in the art are familiar with the neutral network structure and the computed result of the second last layer of the BiGAN, it will not be further described here.

The computing unit SG for the first difference value S1 and the second difference value S2 can be achieved by a loss function, e.g., the cross entropy function or the feature matching loss function. After obtaining the first difference value S1 and the second difference value S2, the processor 13 calculates a sum SV of the first difference value S1 multiplied by a first weight value w1 and the second difference value S2 multiplied by a second weight value w2. Likewise, the first weight value w1 and the second weight value w2 can be adjusted according to the actual operating situation, e.g., the user may evaluate the importance of the generator G and the discriminator D, and adjust the first weight value w1 and the second weight value w2 accordingly. The sum of the first weight value w1 and the second weight value w2 would be 1 (e.g., w1=0.7 and w2=0.3). It shall be noted that, the first weight value w1 and the second weight value w2 applied to the incoming flow recognition model IFM can be different from the first weight value w1 and the second weight value w2 applied to the outgoing flow recognition model OFM.

Next, the processor 13 determines whether the sum SV is greater than a sum threshold. When the sum SV is greater than the sum threshold, the processor 13 determines that the second incoming packets (i.e., a part of the second incoming packets SIP_1-SIP_j) corresponding to the input data UID (i.e., the under-recognized incoming flow data) produce the abnormal incoming flow. As a result, the abnormal flow detection device 1 can learn the packets of the abnormal flow are transmitted to which internal device according to the sum SV generated by the incoming flow recognition model IFM in response to inputting the under-recognized incoming flow data UID_1-UID_q.

Similarly, the aforesaid sum threshold is determined based on the adopted loss function, and those of ordinary skill in the art can understand that the present invention trains the generator G of the BiGAN to generate the flows with the features similar to those generated by the zombie viruses. Therefore, the greater the first difference value S1 and the second difference value S2 are, the greater the difference between the fake data FD and the input data UID is, so the input data UID are considered as generated from a normal flow. On the contrary, the smaller the first difference value S1 and the second difference value S2 are, the smaller the difference between the fake data FD and the input data UID is, so the input data UID are considered as generated from an abnormal flow.

Figure 11:
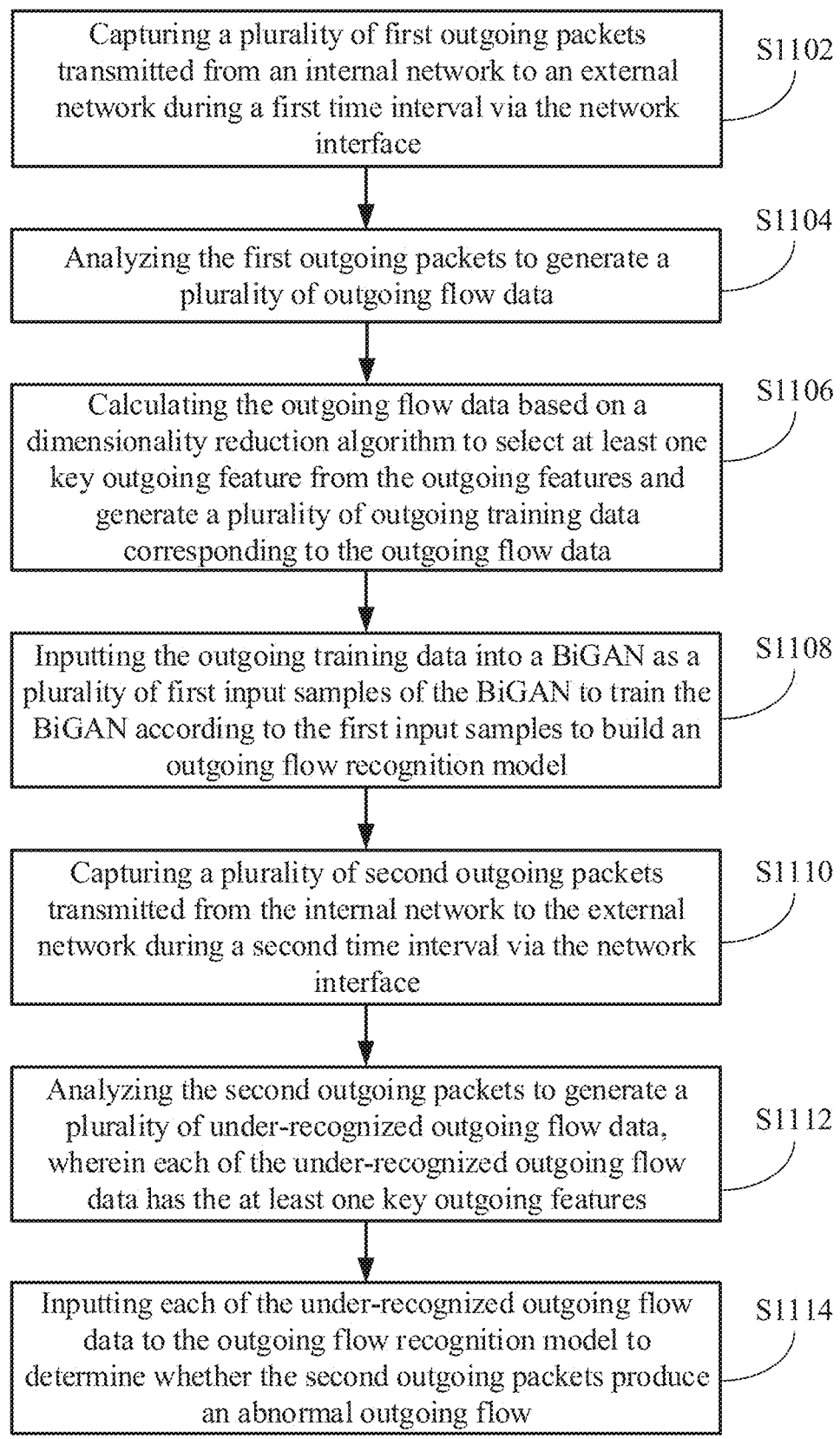
FIG. 11 is a flowchart diagram of the abnormal flow detection method according to the present invention.

A third embodiment of the present invention describes an abnormal flow detection method, and a flowchart diagram thereof is as shown in FIG. 11. The abnormal flow detection method is for use in an abnormal flow detection device (e.g., the abnormal flow detection device 1 described in the aforesaid embodiments). The abnormal flow detection device includes a storage, a network interface and a processor. The processor is electrically connected to the storage and the network interface. The abnormal flow detection method is executed by the processor and includes the steps as follows.

First, in step S1102, a plurality of first outgoing packets transmitted from an internal network to an external network are captured during a first time interval via the network interface. In step S1104, the first outgoing packets are analyzed to generate a plurality of outgoing flow data. Each of the outgoing flow data has a plurality of outgoing features. In step S1106, the outgoing flow data are calculated based on a dimensionality reduction algorithm to select at least one key outgoing feature from the outgoing features and generate a plurality of outgoing training data corresponding to the outgoing flow data. In step S1108, the outgoing training data are inputted into a bidirectional generative adversarial network (BiGAN) as a plurality of first input samples of the BiGAN to train the BiGAN according to the first input samples to build an outgoing flow recognition model.

Next, in step S1110, a plurality of second outgoing packets transmitted from the internal network to the external network are captured during a second time interval via the network interface. In step S1112, the second outgoing packets are analyzed to generate a plurality of under-recognized outgoing flow data. Each of the under-recognized outgoing flow data has the at least one key outgoing feature. In step S1114, each of the under-recognized outgoing flow data are inputted to the outgoing flow recognition model to determine whether the second outgoing packets produce an abnormal outgoing flow.

In other embodiments, the outgoing flow recognition model includes a generator (e.g., the generator G in FIG. 7) and a discriminator (e.g., the discriminator D in FIG. 7). The abnormal flow detection method further includes the following steps of: calculating a first difference value between a fake data generated by the generator and the under-recognized outgoing flow data; calculating a second difference value between two discrimination values generated by the discriminator according to the under-recognized outgoing flow data and the fake data; calculating a sum of the first difference value multiplied by a first weight value and the second difference value multiplied by a second weight value; determining whether the sum is greater than a sum threshold; and determining that the second outgoing packets, corresponding to the under-recognized outgoing flow data, produce the abnormal outgoing flow when the sum is greater than the sum threshold.

In other embodiments, the abnormal flow detection method further includes the following steps of: dividing the first outgoing packets into a plurality of internal groups according to source information of each of the first outgoing packets; and analyzing the first outgoing packets in each of the internal groups to generate the outgoing flow data.

In other embodiments, the outgoing features include an IP feature, an HTTP feature and a flow fraction feature.

In addition to the aforesaid steps, the abnormal flow detection method of the present invention can also execute all the operations described in the aforesaid embodiments and have all the corresponding functions, and how this embodiment executes these operations and has these functions based on the aforesaid embodiments shall be readily appreciated by those of ordinary skill in the art, and thus will not be further described herein.

Figure 12:
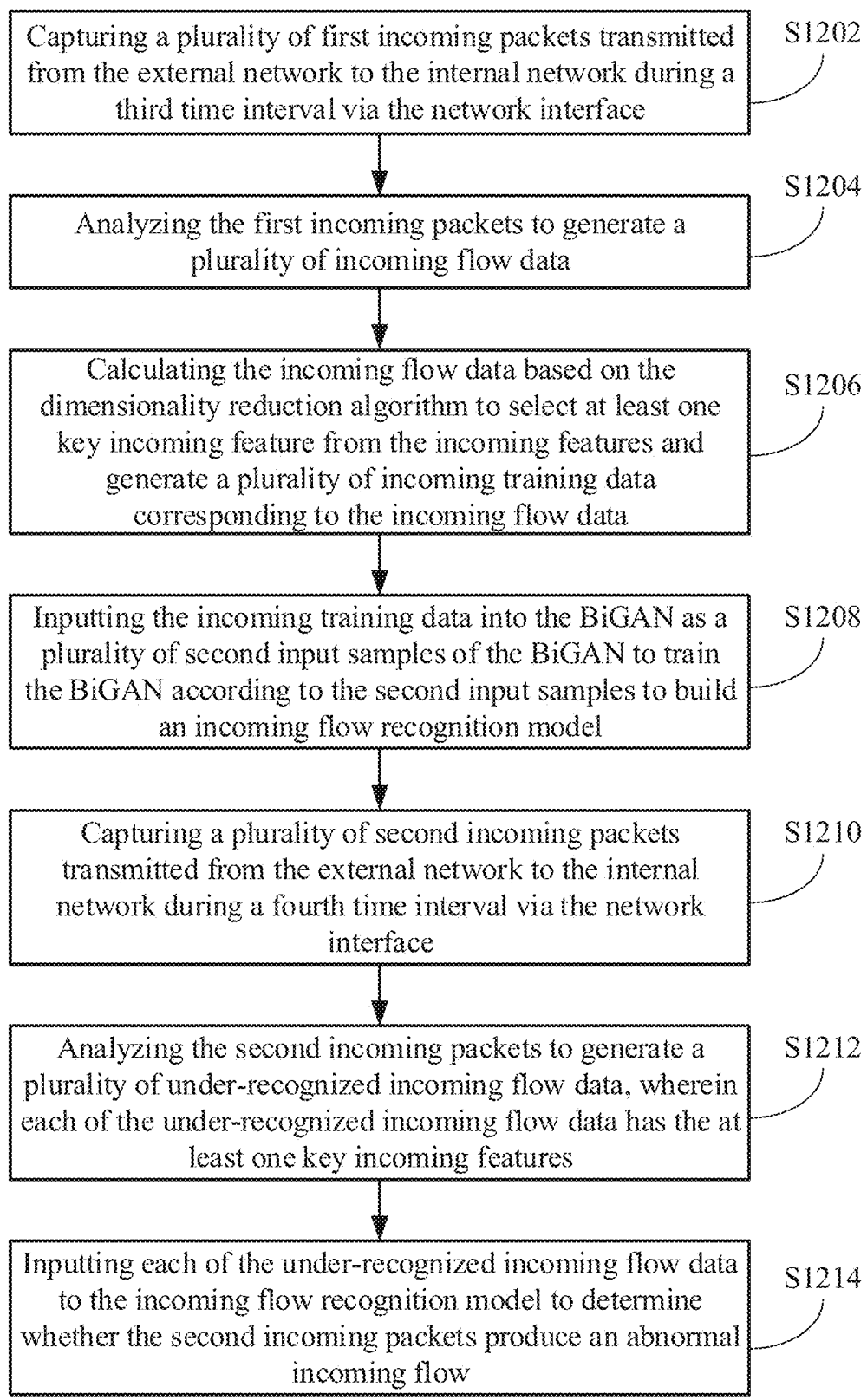
FIG. 12 is a flowchart diagram of the abnormal flow detection method according to the present invention.

A fourth embodiment of the present invention describes an abnormal flow detection method, and a flowchart diagram thereof is as shown in FIGS. 11-12. The fourth embodiment is an extension of the third embodiment. In this embodiment, the abnormal flow detection method further trains an incoming flow recognition model and detects whether the incoming flows are abnormal.

In detail, please refer to FIG. 12, in step S1202, a plurality of first incoming packets transmitted from the external network to the internal network are captured during a third time interval via the network interface. In step S1204, the first incoming packets is analyzed to generate a plurality of incoming flow data. Each of the incoming flow data has a plurality of incoming features. In step S1206, the incoming flow data are calculated based on the dimensionality reduction algorithm to select at least one key incoming feature from the incoming features and generate a plurality of incoming training data corresponding to the incoming flow data. In step S1208, the incoming training data are inputted into the BiGAN as a plurality of second input samples of the BiGAN to train the BiGAN according to the second input samples to build an incoming flow recognition model.

Afterwards, in step S1210, a plurality of second incoming packets transmitted from the external network to the internal network are captured during a fourth time interval via the network interface. In step S1212, the second incoming packets are analyzed to generate a plurality of under-recognized incoming flow data, wherein each of the under-recognized incoming flow data has the at least one key incoming feature. In step S1214, each of the under-recognized incoming flow data are inputted to the incoming flow recognition model to determine whether the second incoming packets produce an abnormal incoming flow.

In other embodiments, the incoming flow recognition model includes a generator (e.g., the generator G in FIG. 10) and a discriminator (e.g., the discriminator D in FIG. 10). The abnormal flow detection method further includes the following steps: calculating a first difference value between a fake data generated by the generator and the under-recognized incoming flow data; calculating a second difference value between two discrimination values generated by the discriminator according to the under-recognized incoming flow data and the fake data; calculating a sum of the first difference value multiplied by a first weight value and the second difference value multiplied by a second weight value; determining whether the sum is greater than a sum threshold; and determining that the second incoming packets, corresponding to the under-recognized incoming flow data, produce the abnormal incoming flow when the sum is greater than the sum threshold.

In other embodiments, the abnormal flow detection method further includes the following steps of: dividing the first incoming packets into a plurality of external groups according to source information of each of the first incoming packets, and analyzing the first incoming packets in each of the external groups to generate the incoming flow data.

In other embodiments, the incoming features include a domain connection feature, a URL connection feature and a domain registration information feature.

In other embodiments, each of the outgoing flow data is associated with one of a plurality of zombie viruses and each of the incoming flow data is associated with one of a plurality of zombie viruses.

In other embodiments, the dimensionality reduction algorithm is one of a linear discriminant analysis (LDA) algorithm, a principal components analysis (PCA) algorithm and a singular value decomposition (SVD) algorithm.

In addition to the aforesaid steps, the abnormal flow detection method of the present invention can also execute all the operations described in the aforesaid embodiments and have all the corresponding functions, and how this embodiment executes these operations and has these functions based on the aforesaid embodiments shall be readily appreciated by those of ordinary skill in the art, and thus will not be further described herein.

According to the above descriptions, the abnormal flow detection mechanism of the present invention can obtain multiple features through analyzing the packets, select the key feature(s) from the features through analyzing the features through the dimensionality reduction algorithm, and increase the diversity of the samples through a deep learning algorithm so as to strengthen the ability for detecting abnormal flows. Therefore, the abnormal flow detection mechanism of the present invention can solve the problem of the limited number and insufficient diversity of the abnormal flow samples so that the abnormal flow detection mechanism can detect abnormal flows effectively.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An abnormal flow detection device, comprising:
a storage;
a network interface; and
a processor, electrically connected to the storage and the network interface and being configured to execute the following operations:
capturing a plurality of first outgoing packets transmitted from an internal network to an external network during a first time interval via the network interface;
analyzing the first outgoing packets to generate a plurality of outgoing flow data, wherein each of the outgoing flow data has a plurality of outgoing features;
calculating the outgoing flow data based on a dimensionality reduction algorithm to select at least one key outgoing feature from the outgoing features and generate a plurality of outgoing training data corresponding to the outgoing flow data;
inputting the outgoing training data into a bidirectional generative adversarial network (BiGAN) as a plurality of first input samples of the BiGAN to train the BiGAN according to the first input samples to build an outgoing flow recognition model;
capturing a plurality of second outgoing packets transmitted from the internal network to the external network during a second time interval via the network interface;
analyzing the second outgoing packets to generate a plurality of under-recognized outgoing flow data, wherein each of the under-recognized outgoing flow data has the at least one key outgoing feature; and
inputting each of the under-recognized outgoing flow data to the outgoing flow recognition model to determine whether the second outgoing packets produce an abnormal outgoing flow;
wherein the outgoing flow recognition model comprises a generator for outgoing and a discriminator for outgoing, and the processor further executes the following operations for each of the under-recognized outgoing flow data:
calculating a first difference value for outgoing between a fake data for outgoing generated by the generator for outgoing and the under-recognized outgoing flow data;
calculating a second difference value for outgoing between two discrimination values for outgoing generated by the discriminator for outgoing according to the under-recognized outgoing flow data and the fake data for outgoing;
calculating a sum for outgoing of the first difference value for outgoing multiplied by a first weight value for outgoing and the second difference value for outgoing multiplied by a second weight value for outgoing;
determining whether the sum for outgoing is greater than a sum threshold for outgoing; and
determining that the second outgoing packets corresponding to the under-recognized outgoing flow data produce the abnormal outgoing flow when the sum for outgoing is greater than the sum threshold for outgoing.

2. The abnormal flow detection device of claim 1, wherein the processor further divides the first outgoing packets into a plurality of internal groups according to source information of each of the first outgoing packets, and analyses the first outgoing packets in each of the internal groups to generate the outgoing flow data.

3. The abnormal flow detection device of claim 1, wherein the outgoing features comprises an Internet Protocol (IP) feature, a HyperText Transfer Protocol (HTTP) feature and a flow fraction feature.

4. The abnormal flow detection device of claim 1, wherein the processor further executes the following operations:
capturing a plurality of first incoming packets transmitted from the external network to the internal network during a third time interval via the network interface;
analyzing the first incoming packets to generate a plurality of incoming flow data, wherein each of the incoming flow data has a plurality of incoming features;
calculating the incoming flow data based on the dimensionality reduction algorithm to select at least one key incoming feature from the incoming features and generate a plurality of incoming training data corresponding to the incoming flow data;
inputting the incoming training data into the BiGAN as a plurality of second input samples of the BiGAN to train the BiGAN according to the second input samples to build an incoming flow recognition model;
capturing a plurality of second incoming packets transmitted from the external network to the internal network during a fourth time interval via the network interface;
analyzing the second incoming packets to generate a plurality of under-recognized incoming flow data, wherein each of the under-recognized incoming flow data has the at least one key incoming feature; and
inputting each of the under-recognized incoming flow data to the incoming flow recognition model to determine whether the second incoming packets produce an abnormal incoming flow.

5. The abnormal flow detection device of claim 4, wherein the incoming flow recognition model comprises a generator for incoming and a discriminator for incoming, and the processor further executes the following operations for each of the under-recognized incoming flow data:
calculating a first difference value for incoming between a fake data for incoming generated by the generator for incoming and the under-recognized incoming flow data;
calculating a second difference value for incoming between two discrimination values for incoming generated by the discriminator for incoming according to the under-recognized incoming flow data and the fake data for incoming;
calculating a sum for incoming of the first difference value for incoming multiplied by a first weight value for incoming and the second difference value for incoming multiplied by a second weight value for incoming;
determining whether the sum for incoming is greater than a sum threshold for incoming; and
determining that the second incoming packets corresponding to the under-recognized incoming flow data produce the abnormal incoming flow when the sum for incoming is greater than the sum threshold for incoming.

6. The abnormal flow detection device of claim 5, wherein the processor further divides the first incoming packets into a plurality of external groups according to source information of each of the first incoming packets, and analyses the first incoming packets in each of the external groups to generate the incoming flow data.

7. The abnormal flow detection device of claim 4, wherein the incoming features comprises a domain connection feature, a Uniform Resource Locator (URL) connection feature and a domain registration information feature.

8. The abnormal flow detection device of claim 4, wherein each of the outgoing flow data is associated with one of a plurality of zombie viruses and each of the incoming flow data is associated with one of the of zombie viruses.

9. The abnormal flow detection device of claim 1, wherein the dimensionality reduction algorithm is one of a linear discriminant analysis (LDA) algorithm, a principal components analysis (PCA) algorithm, and a singular value decomposition (SVD) algorithm.

10. An abnormal flow detection method for an abnormal flow detection device, the abnormal flow detection device comprising a storage, a network interface and a processor, the processor being electrically connected to the storage and the network interface, the abnormal flow detection method being executed by the processor and comprising:
capturing a plurality of first outgoing packets transmitted from an internal network to an external network during a first time interval via the network interface;
analyzing the first outgoing packets to generate a plurality of outgoing flow data, wherein each of the outgoing flow data has a plurality of outgoing features;
calculating the outgoing flow data based on a dimensionality reduction algorithm to select at least one key outgoing feature from the outgoing features and generate a plurality of outgoing training data corresponding to the outgoing flow data;
inputting the outgoing training data into a bidirectional generative adversarial network (BiGAN) as a plurality of first input samples of the BiGAN to train the BiGAN according to the first input samples to build an outgoing flow recognition model;
capturing a plurality of second outgoing packets transmitted from the internal network to the external network during a second time interval via the network interface;
analyzing the second outgoing packets to generate a plurality of under-recognized outgoing flow data, wherein each of the under-recognized outgoing flow data has the at least one key outgoing feature; and
inputting each of the under-recognized outgoing flow data to the outgoing flow recognition model to determine whether the second outgoing packets produce an abnormal outgoing flow;
wherein the outgoing flow recognition model comprises a generator for outgoing and a discriminator for outgoing, and the abnormal flow detection method further comprising:

calculating a first difference value for outgoing between a fake data for outgoing generated by the generator for outgoing and the under-recognized outgoing flow data;
calculating a second difference value for outgoing between two discrimination values for outgoing generated by the discriminator for outgoing according to the under-recognized outgoing flow data and the fake data for outgoing;
calculating a sum for outgoing of the first difference value for outgoing multiplied by a first weight value for outgoing and the second difference value for outgoing multiplied by a second weight value for outgoing;
determining whether the sum for outgoing is greater than a sum threshold for outgoing; and
determining that the second outgoing packets corresponding to the under-recognized outgoing flow data produce the abnormal outgoing flow when the sum for outgoing is greater than the sum threshold for outgoing.

11. The abnormal flow detection method of claim 10, further comprising:
dividing the first outgoing packets into a plurality of internal groups according to source information of each of the first outgoing packets; and
analyzing the first outgoing packets in each of the internal groups to generate the outgoing flow data.

12. The abnormal flow detection method of claim 10, wherein the outgoing features comprises an IP feature, an HTTP feature and a flow fraction feature.

13. The abnormal flow detection method of claim 10, further comprising:
capturing a plurality of first incoming packets transmitted from the external network to the internal network during a third time interval via the network interface;
analyzing the first incoming packets to generate a plurality of incoming flow data, wherein each of the incoming flow data has a plurality of incoming features;
calculating the incoming flow data based on the dimensionality reduction algorithm to select at least one key incoming feature from the incoming features and generate a plurality of incoming training data corresponding to the incoming flow data;
inputting the incoming training data into the BiGAN as a plurality of second input samples of the BiGAN to train the BiGAN according to the second input samples to build an incoming flow recognition model;
capturing a plurality of second incoming packets transmitted from the external network to the internal network during a fourth time interval via the network interface;
analyzing the second incoming packets to generate a plurality of under-recognized incoming flow data, wherein each of the under-recognized incoming flow data has the at least one key incoming feature; and
inputting each of the under-recognized incoming flow data to the incoming flow recognition model to determine whether the second incoming packets produce an abnormal incoming flow.

14. The abnormal flow detection method of claim 13, wherein the incoming flow recognition model comprises a generator for incoming and a discriminator for incoming, and the abnormal flow detection method further comprising:
calculating a first difference value for incoming between a fake data for incoming generated by the generator for incoming and the under-recognized incoming flow data;
calculating a second difference value for incoming between two discrimination values for incoming generated by the discriminator for incoming according to the under-recognized incoming flow data and the fake data for incoming;

calculating a sum for incoming of the first difference value for incoming multiplied by a first weight value for incoming and the second difference value for incoming multiplied by a second weight value for incoming;

determining whether the sum for incoming is greater than a sum threshold for incoming; and determining that the second incoming packets corresponding to the under-recognized incoming flow data produce the abnormal incoming flow when the sum for incoming is greater than the sum threshold for incoming.

15. The abnormal flow detection method of claim 14, further comprising:

dividing the first incoming packets into a plurality of external groups according to source information of each of the first incoming packets, and analysing the first incoming packets in each of the external groups to generate the incoming flow data.

16. The abnormal flow detection method of claim 13, wherein the incoming features comprises a domain connection feature, a URL connection feature and a domain registration information feature.

17. The abnormal flow detection method of claim 13, wherein each of the outgoing flow data is associated with one of a plurality of zombie viruses and each of the incoming flow data is associated with one of a plurality of zombie viruses.

18. The abnormal flow detection method of claim 10, wherein the dimensionality reduction algorithm is one of a linear discriminant analysis (LDA) algorithm, a principal components analysis (PCA) algorithm and a singular value decomposition (SVD) algorithm.

* * * * *